United States Patent [19]

Cole, Jr. et al.

[11] 4,128,313
[45] Dec. 5, 1978

[54] LIQUID CRYSTAL DISPLAY WITH DARK CHARACTERS ON LIGHT BACKGROUND

[75] Inventors: Herbert S. Cole, Jr., Scotia; Charles R. Stein, Schenectady, both of N.Y.

[73] Assignee: General Electric Company, Schenectady, N.Y.

[21] Appl. No.: 825,659

[22] Filed: Aug. 18, 1977

[51] Int. Cl.² .................................................. G02F 1/13
[52] U.S. Cl. .................... 350/340; 350/341; 350/349
[58] Field of Search .................. 350/340, 341, 349

[56] References Cited
U.S. PATENT DOCUMENTS

| 3,864,022 | 2/1975 | Moriyama et al. | 350/349 |
| 3,966,304 | 6/1976 | Kakeda | 350/341 |
| 4,002,404 | 1/1977 | Dir | 350/340 |

*Primary Examiner*—Edward S. Bauer
*Attorney, Agent, or Firm*—Geoffrey H. Krauss; Joseph T. Cohen; Marvin Synder

[57] ABSTRACT

A dichroic liquid crystal display of the parallel-nematic type is caused to have a bright background, indicative of the light-transmissive state, and dark characters, in the unactivated condition, by treatment of the display electrodes to cause boundaries of the dichroic liquid crystal material to be normally homeotropic except in those areas defining a character, in which areas a pattern of silicon oxide or other parallel alignment surfactant is deposited by masking techniques.

21 Claims, 5 Drawing Figures

LIQUID CRYSTAL DISPLAY WITH DARK CHARACTERS ON LIGHT BACKGROUND

BACKGROUND OF THE INVENTION

The present invention relates to liquid crystal displays and, more particularly, to a novel dichroic liquid crystal display having a bright background and dark characters in the unactivated state of the parallel-nematic mode.

Known dichroic liquid crystal displays, i.e. a display in which the liquid crystal material is host to a guest dichroic dye, apparently operate best in the parallel-nematic configuration, wherein the elongated axes, or directors of both the liquid crystal molecules and their guest, light-absorbing dichroic dye molecules, are aligned in the same direction parallel to the wall of the display cell, in the electrically unexcited state. In this condition, the molecules absorb the majority of incident light, and render the background of the display, as well as any unactivated character segments, to a dark condition. Character segments are electrically excited to align the molecules perpendicular to the cell walls and achieve a less-absorbing state displaying relatively bright characters against the dark background. Thus, while the character segments can be energized between bright and dark conditions, the background areas are generally relatively dark, due to the parallel molecular alignment thereat and hitherto could only be placed in a bright condition by continual electrical activation of the background areas. Conditional electrical activation is not desirable from the viewpoint of cell fabrication cost and generation of an additional signal for such activation. Accordingly, a dichroic liquid crystal display operating in the parallel-nematic mode and having a relatively bright background upon which appear relatively dark characters, without electrical activation of background areas, is highly desirable.

BRIEF SUMMARY OF THE INVENTION

In accordance with the invention, a dichroic liquid crystal display having relatively dark characters and a relatively light background is provided by treating at least one of a pair of cell electrodes, each supported upon a transparent substrate, in a manner to achieve a homeotropic alignment over the entire electrode area. Character segment areas are masked on the treated electrode by means of a patterned mask or a layer of photoresist, respectively suitably etched or developed to provide apertures over the character segment areas; a parallel-alignment film, of a suitable surfactant or obliquely-deposited SiO, is fabricated upon the uncovered areas of the electrode. Upon assembly of the cell, the host liquid crystal-guest dichroic dye composition assumes a homeotropic alignment and a parallel alignment, respectively, in the background and character segment areas, respectively, in the no-field-applied condition. Upon application of a field between character segment electrodes, the parallel alignment is forced to the perpendicular alignment to "extinguish" the character segment by changing the normally dark appearance thereof to the same bright appearance as the background areas.

In a presently preferred embodiment, only one of the pair of conductive electrodes receives the parallel alignment treatment, to even further reduce fabrication costs.

Accordingly, it is one object of the present invention to provide a method for fabricating a dichroic liquid crystal cell having a bright background and dark character segments in the unactivated condition.

It is another object of the present invention to provide a novel dichroic liquid crystal cell having dark characters upon a bright background.

These and other objects of the present invention will become apparent upon consideration of the following detailed description and the accompanying drawings.

DETAILED DESCRIPTION OF THE INVENTION

Figure 1A:
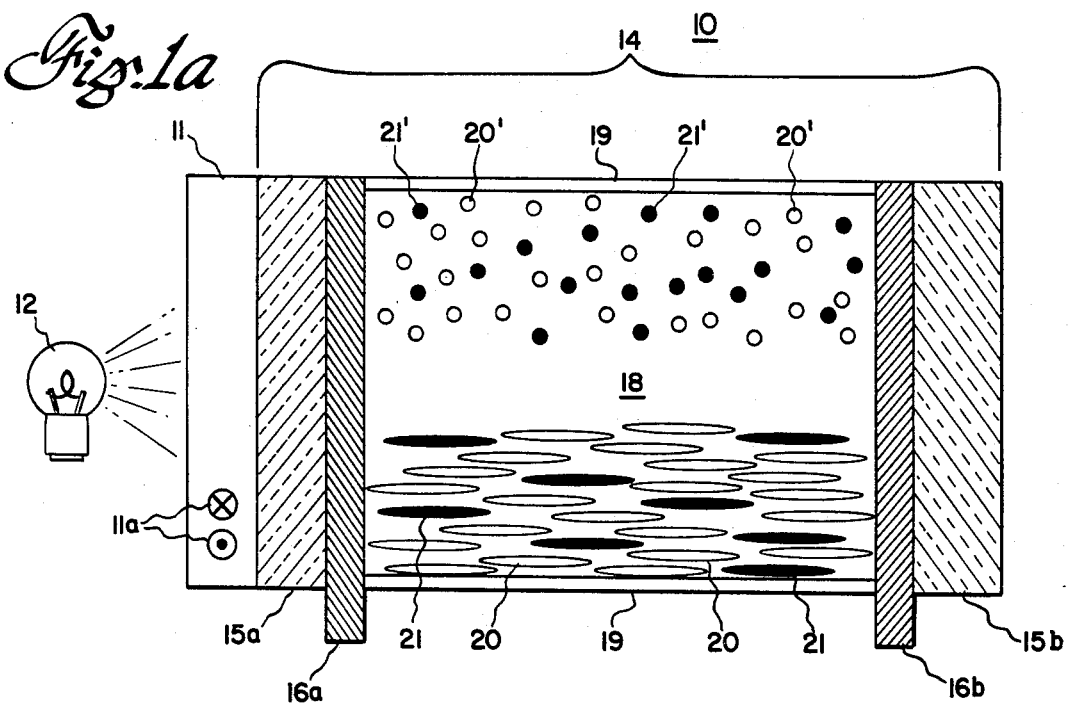
FIG. 1a is a sectional side view through a transmissive dichroic liquid crystal display cell in accordance with the principles of the present invention, and of apparatus with which the cell is used.
Figure 1B:
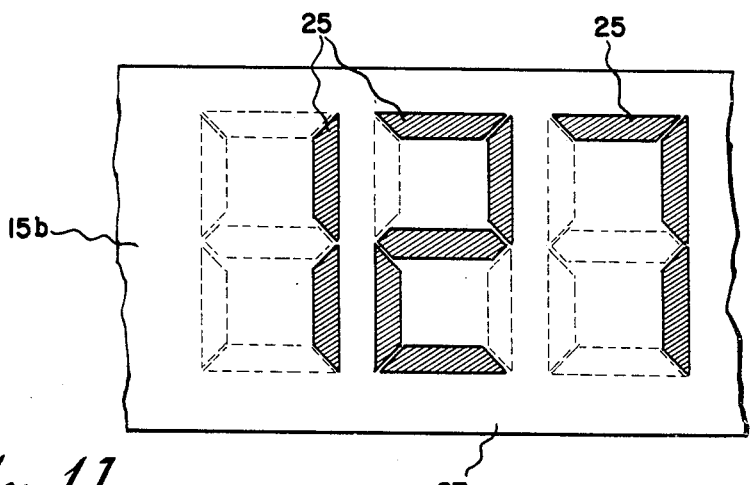
FIG. 1b is a front view of the cell of FIG. 1.

Referring initially to FIGS. 1a and 1b, a liquid crystal display 10 comprises a linear polarizing element 11 disposed between a light source 12 and a dichroic liquid crystal cell 14. Polarizing element 11 is disposed with its polarization vector 11a in the horizontal direction, as indicated by the polarization vector arrows into and out of the plane of the drawing.

Liquid crystal cell 14 includes a pair of substantially transparent, insulating substrates 15a and 15b (of glass and the like), each having a substantially transparent conductive electrode 16a or 16b fabricated (of tin oxide and the like) upon the interior facing surfaces thereof. A quantity of a dichroic liquid crystal composition 18 fills the volume between the spaced-apart electrodes and is retained therein by gasket means 19. Liquid crystal composition 18 is comprised of molecule 20 of a nematic liquid crystal material in which is dissolved molecules 21 of a dichroic dye material.

It is desired to form indicia 25 which are viewable, looking leftwardly toward substrate 15b in the illustrated transmissive display, as relatively dark areas, upon a relatively bright background 27 over the remainder the display area. It should be understood, however, that display 10 may equally as well be a reflective display utilizing reflective elements (not shown for reasons of simplicity) situated adjacent that surface of substrate 15b opposite electrode 16b, in manner well known to the art.

The relatively bright (and hence substantially transmissive) background area 27 is formed by causing the elongated liquid crystal and dye molecules 20 and 21, respectively, to be positioned with their elongated axes, or directors, aligned in a common direction perpendicular, i.e. homeotropic, to the plane of electrodes 16. Light from source 12 passes through polarizing element 11 and a horizontal polarization is imparted thereto; the homeotropically aligned dichroic liquid crystal material absorbs relatively little of the incident light, whereby the corresponding viewable areas of the display appear with relative brightness.

Relatively dark (and hence absorptive) indicia, or character, segments 25 are formed by causing the elongated liquid crystal and dye molecules 20' and 21', respectively, to be positioned with their directors aligned in a common direction parallel to the plane of electrode 16 and with the common direction aligned parallel to polarization axis 11a of the polarizing element. In this parallel-aligned condition, the dichroic dye molecules absorb substantially all of the polarized light and prevent transmission of light to the viewable surface of the display.

Figure 2A:
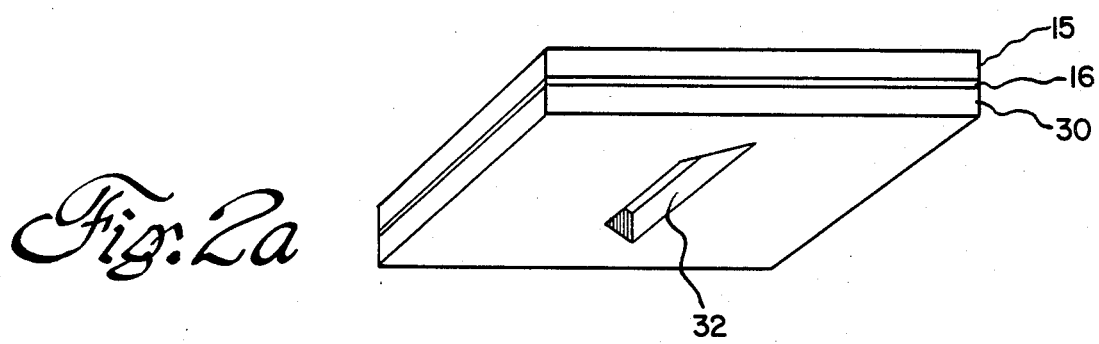
FIGS. 2a, 2b and 2c are respectively a perspective view, a side view of an end element of the liquid crystal cell during fabrication in accordance with the principles of the present invention and a side section illustrating operation of the cell.
Figure 2B:
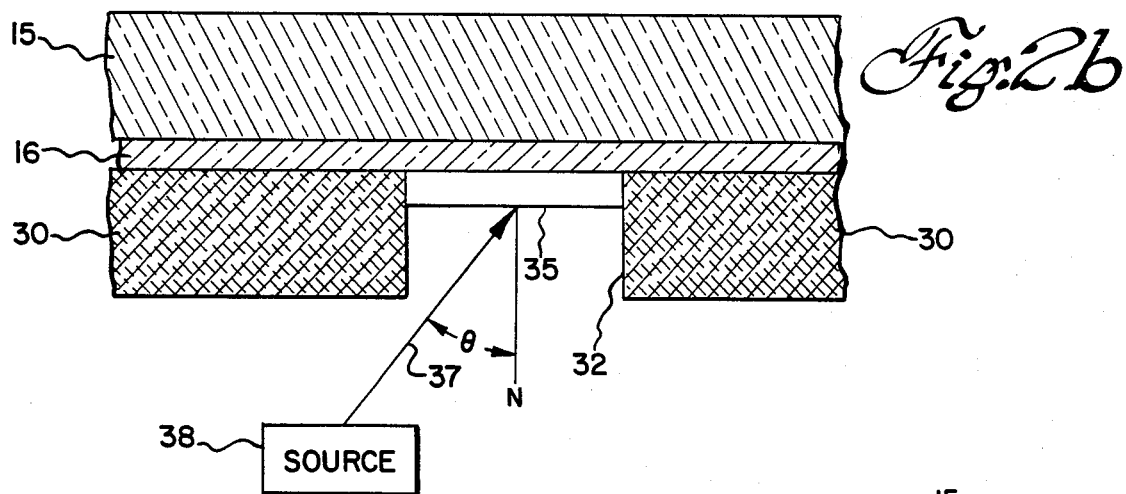
Figure 2C:
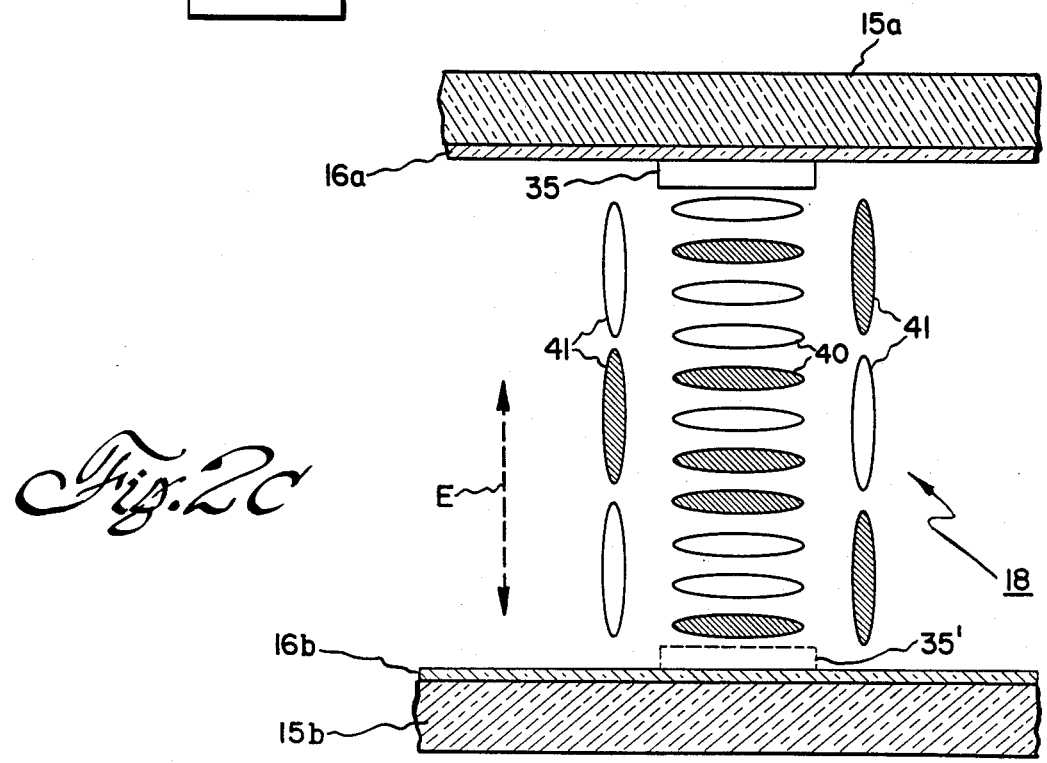

Referring now to FIGS. 2a-2c, both of electrodes 16 are treated to cause the homeotropic alignment condition at the boundary between the liquid crystal material and the entire background-forming area of the electrode, assuring a relatively bright background area. At least one of electrodes 16, supported by its associated substrate 15, is then coated with a layer 30 of a photoresist material. A desired pattern, such as for segmented numerals, is exposed by suitable techniques upon the photoresist layer and the layer is then developed by known techniques to remove a volume of a photoresist material beneath each exposed area and cause a like-patterned aperture 32 to extend through the photoresist layer to the adjacent surface of the underlying electrode 16 (FIG. 2a). It should be understood that element 30 may equally as well be a mask having apertures 32 formed therethrough of suitable pattern, with the mask being held in abutting relationship against the surface of the electrode.

A parallel-alignment film 35 is deposited upon the surface of electrode 16 through each aperture 32, with the remaining photoresist film or mask 30 preventing deposition of the parallel-alignment film on the remainder of the electrode, forming the background area. Parallel-alignment film 35 may be a suitable surfactant or may be, as illustrated, silicon monoxide (SiO) obliquely deposited, as shown by arrow 37, at an angle $\theta$ (typically 60°) from the normal N to the plane of the electrode, in a manner as known to the art (FIG. 2b).

The mask or film 30 is removed from the electrode 16 now having the parallel-alignment film on selected areas of the surface thereof. The cell is constructed with the parallel-alignment film 35 facing the opposite electrode, across the volume of dichroic liquid crystal material 18 (FIG. 2c). As previously mentioned, only one of electrodes 16a and 16b need have the patterned parallel-alignment film 35 formed thereon, e.g. electrode 16a in FIG. 2c; it should be understood that the remaining electrode, e.g. 16b, may have a corresponding pattern of parallel-alignment film 35' fabricated thereon by the above process and may then be arranged such that both patterns are in registration each to the other.

Alternatively, in a presently preferred embodiment wherein sealing means 19 (FIG. 1a) is formed of glass frit and the like, heated to a suitable temperature to form a liquid-impervious barrier containing the dichroic liquid crystal material between the electrodes, the process may commence with the step of masking the electrode and can dispense with the step of applying a homeotropic-alignment treatment to the electrodes, as the temperature required for forming the seal will generally sufficiently clean the interior facing surfaces of both electrodes to a degree satisfactory for homeotropic alignment of those molecules adjacent to the portion of the electrode devoid of the parallel-alignment film. It should be understood that the parallel-alignment film must be such as to have its alignment properties relatively undisturbed at temperatures up to the temperature utilized for formation of sealing means 19.

Upon fabrication of the cell and placement of the polarizing element adjacent, and preferably in abutting relationship against, the exterior surface of one substrate, e.g. 15a, and with the cell in the unactivated condition, the elongated liquid crystal and dichroic dye molecules 40 assume the parallel-alignment condition between those portions of electrodes 16 having the parallel-alignmemnt film 35 (or 35 and 35') thereon and the remaining liquid crystal and dichroic dye molecules 41, positioned between those portions of the electrodes devoid of the parallel-alignment film (or films) assume the homeotropic-alignment condition with their detectors substantially perpendicular to the electrode surfaces. Thus, light is absorbed by the parallel-aligned molecules 40 and is transmitted by the homeotropically-aligned molecules 41 to provide dark characters upon a relatively light background. Upon activation of the cell, by connection of a suitable source of electrical potential (not shown for purposes of simplicity) between electrode 16a and 16b, the resulting electric field E (shown in broken line in FIG. 2c) caused the previously parallelly-aligned molecules 40 to move such that their elongated axes each lie parallel to the field direction and hence perpendicular to the plane of the electrodes, whereby light is substantially transmitted therethrough and causes the character or indicia segment so activated to change from the previous dark condition to a bright condition, of relatively brightness substantially equal to the brightness of the background areas already having the dichroic liquid crystal material molecules aligned with their axes perpendicular to the electrode surfaces.

The embodiment wherein each electrode has a parallel-alignment film thereon in registration with another parallel film on the opposite electrode, is particularly useful in that, if obliquely deposited SiO is utilized, the direction of oblique deposition can be rotated 90°, in the plane of the electrodes, before fabrication of one of the electrodes, with respect to the other, whereby all of molecules 40 are aligned parallel to the electrode plane but with a 90° twist imparted to the succession of molecules between one electrode and the other, to achieve a display of the dichroic twisted-nematic type, yet having dark indicia viewable on a bright background.

While the present invention has been described with reference to several preferred processes and embodiments thereof, many variations and modifications will now occur to those skilled in the art. It is our intent, therefore, to be limited solely by the scope of the appending claims and not by the specific embodiments disclosed herein.

What is clamed is:

1. A method for fabricating a dichroic liquid crystal cell for a display having relatively dark indicia upon a relatively light background, comprising the steps of:
   a. providing a pair of substantially transparent electrodes;
   b. fabricating upon at least one of the electrodes a parallel-alignment film in each of at least one area defining the indicia;
   c. treating the remainder of the surface area of each electrode to form a homeotropic-alignment boundary;
   d. positioning the treated surfaces of the pair of electrodes in facing, spaced-apart relationship; and
   e. filling the volume between the spaced electrodes with a dichroic nematic liquid crytal material.

2. The method as set forth in claim 1, wherein step (b) comprises the steps of: providing a mask having an aperture defining each area to receive the film; positioning the mask adjacent to a surface of the at least one electrode; and depositing a parallel-alignment material through each aperture and onto the electrode surface.

3. The method as set forth in claim 2, wherein the parallel-alignment material is a surfactant.

4. The method as set forth in claim 2, wherein the parallel-alignment material is silicon monoxide.

5. The method as set forth in claim 4, further including the step of obliquely depositing the silicon monoxide at an angle to the normal to the electrode surface.

6. The method as set forth in claim 5, wherein the angle is substantially equal to 60°.

7. The method as set forth in claim 5, further including the steps of fabricating a parallel-alignment film upon a surface of each electrode; and positioning the treated surfaces of the electrodes in alignment with one another.

8. The method as set forth in claim 7, further comprising the step of depositing the parallel-alignment film of each of the pair of electrodes substantially with 90° orientation, in the plane of electrode surface, with respect to each other, to achieve a twisted-nematic liquid crystal cell.

9. The method as set forth in claim 1, wherein step (b) comprises the steps of: fabricating a layer of a photoresist material upon a surface of the at least one electrode; exposing the photoresist layer at areas thereof defining the at least one area of the indicia; developing the exposed photoresist layer to cause an aperture defining the at least one indicia area to extend through the layer; and depositing a parallel-alignment material through each aperture and upon the electrode surface.

10. The method as set forth in claim 9, wherein the parallel-alignment material is a surfactant.

11. The method as set forth in claim 9, wherein the parallel-alignment material is silicon monoxide.

12. The method as set forth in claim 11, further including the step of obliquely depositing the slicon monoxide at an angle to the normal to the electrode surface.

13. The method as set forth in claim 12, wherein the angle is substantially equal to 60°.

14. The method as set forth in claim 12, further including the steps of fabricating a parallel-alignment film upon a surface of each electrode; and positioning the treated surfaces of the electrodes in alignment with one another.

15. The method as set forth in claim 14, further comprising the step of depositing the parallel-alignment film of each of the pair of electrodes substantially with 90° orientation, in the plane of electrode surface, with respect to each other, to achieve a twisted-nematic liquid crystal cell.

16. The method of claim 1, wherein step (c) comprises step of treating the entire surface of each electrode to induce a homeotropic-alignment condition thereat, prior to the step of fabricating areas of parallel-alignment film upon the surface of at least one of the electrodes.

17. The method of claim 1, wherein step (c) comprises the step of cleaning that portion of the surface of each electrode devoid of parallel-alignment film, after step (b) is completed, to induce a homeotropic-alignment condition thereat.

18. A display cell comprising:
first and second electrodes formed of a substantially transparent and conductive material; said electrodes positioned in facing, spaced-apart relationship;
a dichroic nematic liquid crystal composition filling the volume between said first and second electrodes;
a film upon that surface of at least one of said first and second electrodes facing the other of said electrodes, said film defining each of at least one area of indicia to be displayed and causing the liquid crystal material extending through said cell behind said film to assume a parallel-alignment condition in an unactivated state; and
the remaining surface areas of said first and second electrodes being treated to cause the liquid crystal material extending through said cell behind said remaining areas to assume a homeotropic-alignment condition;
said remaining areas being viewable as a relatively bright background and each of the areas having said film being viewable as a relatively dark area in the unactivated state and a relatively bright area in an activated state.

19. The display cell of claim 18, wherein the film comprises a surfactant.

20. The display cell of claim 18, wherein the film comprises silicon monoxide.

21. The display cell of claim 29, wherein both electrodes have aligned areas of silicon monoxide film, and the direction of parallel-alignment of the film on each electrode surface is substantially 90° with respect to the other electrode; the liquid crystal material between the aligned films assuming a twisted configuration in the unactivated condition.

* * * * *